United States Patent
Ben-Kiki et al.

(10) Patent No.: US 11,727,217 B2
(45) Date of Patent: Aug. 15, 2023

(54) SYSTEMS AND METHODS FOR DYNAMIC USER INTERACTION FOR IMPROVING MENTAL HEALTH

(71) Applicant: Happify, Inc., New York, NY (US)

(72) Inventors: Tomer Ben-Kiki, New York, NY (US); Ran Zilca, Ra'anana (IL); Derrick Carpenter, Middletown, CT (US)

(73) Assignee: TWILL, INC., New York, NY (US)

( * ) Notice: Subject to any disclaimer, the term of this patent is extended or adjusted under 35 U.S.C. 154(b) by 0 days.

(21) Appl. No.: 17/671,251

(22) Filed: Feb. 14, 2022

(65) Prior Publication Data
US 2022/0164541 A1    May 26, 2022

Related U.S. Application Data

(63) Continuation of application No. 15/974,978, filed on May 9, 2018, now abandoned, which is a (Continued)

(51) Int. Cl.
*G06F 40/30* (2020.01)

(52) U.S. Cl.
CPC .................................. *G06F 40/30* (2020.01)

(58) Field of Classification Search
None
See application file for complete search history.

(56) References Cited

U.S. PATENT DOCUMENTS

| 5,435,324 A | 7/1995 | Brill |
| 5,722,418 A | 3/1998 | Bro |

(Continued)

FOREIGN PATENT DOCUMENTS

| CN | 101799849 A | 8/2010 |
| CN | 102933136 A | 2/2013 |

(Continued)

OTHER PUBLICATIONS

"Greenolive: an Open Platform for Wellness Management Ecosystem", by Zeng et al., 2010 (Year: 2010).
(Continued)

*Primary Examiner* — Tonia L Dollinger
*Assistant Examiner* — Jonathan A Sparks
(74) *Attorney, Agent, or Firm* — Bochner PLLC; Andrew D. Bochner

(57) ABSTRACT

A computing system for interacting with a user comprises a processor and a memory storing executable software which, when executed by the processor, causes the processor to commence an interactive session with a user, receive input data from the user during the interactive session, analyze the received input data and output a response to the user to continue the interactive session with the user. The processor, prior to outputting the response, identifies one or more topics from the received input data, ascertains a tone of the received input data, generates a mirroring prompt based on the ascertained tone of the received input data, and output to the user the generated mirroring prompt. The processor outputs the mirroring prompt to the user during the interactive session to cause an increase in a level of engagement of the user with the interactive session.

25 Claims, 6 Drawing Sheets

Related U.S. Application Data continuation-in-part of application No. 14/990,380, filed on Jan. 7, 2016, now abandoned, and a continuation-in-part of application No. 14/284,229, filed on May 21, 2014, now abandoned.

(60) Provisional application No. 62/656,231, filed on Apr. 11, 2018, provisional application No. 62/533,423, filed on Jul. 17, 2017, provisional application No. 62/101,315, filed on Jan. 8, 2015, provisional application No. 61/825,742, filed on May 21, 2013.

(56) References Cited

U.S. PATENT DOCUMENTS

| | | |
|---|---|---|
| 6,293,904 B1 | 9/2001 | Blazey et al. |
| 6,728,679 B1 | 4/2004 | Strubbe et al. |
| 7,644,060 B2 | 1/2010 | Kadri |
| 8,577,671 B1 | 11/2013 | Barve et al. |
| 9,302,179 B1 | 4/2016 | Merzenich et al. |
| 9,754,308 B2 | 9/2017 | Pinckney et al. |
| 2003/0059750 A1 | 3/2003 | Bindler et al. |
| 2005/0228691 A1 | 10/2005 | Paparo |
| 2007/0143281 A1 | 6/2007 | Smirin et al. |
| 2009/0037470 A1 | 2/2009 | Schmidt |
| 2009/0119234 A1 | 5/2009 | Pinckney et al. |
| 2009/0171902 A1 | 7/2009 | MacLaurin et al. |
| 2010/0218118 A1 | 8/2010 | Bronkema |
| 2011/0125844 A1 | 5/2011 | Collier et al. |
| 2011/0183305 A1 | 7/2011 | Orbach |
| 2012/0095862 A1 | 4/2012 | Schiff et al. |
| 2012/0238800 A1 | 9/2012 | Naujokat et al. |
| 2012/0246102 A1 | 9/2012 | Sudharsan |
| 2012/0315613 A1 | 12/2012 | Shatte et al. |
| 2013/0101970 A1 | 4/2013 | Mascarenhas |
| 2013/0144605 A1 | 6/2013 | Brager et al. |
| 2013/0216989 A1 | 8/2013 | Cuthbert |
| 2014/0032234 A1 | 1/2014 | Anderson |
| 2014/0157171 A1 | 6/2014 | Brust et al. |
| 2014/0212853 A1 | 7/2014 | Divakaran et al. |
| 2014/0223462 A1 | 8/2014 | Aimone et al. |
| 2014/0274413 A1 | 9/2014 | Chelst |
| 2014/0276244 A1 | 9/2014 | Kamyar |
| 2014/0351332 A1 | 11/2014 | Ben-Kiki et al. |
| 2015/0140527 A1 | 5/2015 | Gilad-Barach et al. |
| 2015/0199010 A1 | 7/2015 | Coleman et al. |
| 2015/0199913 A1 | 7/2015 | Mayfield et al. |
| 2015/0297109 A1 | 10/2015 | Garten et al. |
| 2015/0339363 A1 | 11/2015 | Moldoveanu et al. |
| 2015/0348569 A1 | 12/2015 | Allam et al. |
| 2015/0351655 A1 | 12/2015 | Coleman |
| 2015/0371663 A1 | 12/2015 | Gustafson et al. |
| 2016/0042648 A1* | 2/2016 | Kothuri ............... G06K 9/6289 434/236 |
| 2016/0048772 A1 | 2/2016 | Bruno et al. |
| 2016/0055236 A1 | 2/2016 | Frank et al. |
| 2016/0203729 A1 | 7/2016 | Zilca |
| 2016/0217501 A1 | 7/2016 | Brigham |
| 2016/0350687 A1 | 12/2016 | Yamamoto et al. |
| 2017/0032279 A1 | 2/2017 | Miserendino et al. |
| 2017/0125008 A1 | 5/2017 | Maisonnier et al. |
| 2017/0169531 A1 | 6/2017 | Lycas |
| 2017/0345324 A1 | 11/2017 | Fanty et al. |
| 2018/0075368 A1 | 3/2018 | Brennan et al. |
| 2018/0108353 A1 | 4/2018 | Gustafson et al. |
| 2018/0189267 A1* | 7/2018 | Takiel ................... G06F 40/205 |
| 2018/0260387 A1 | 9/2018 | Ben-Kiki et al. |
| 2018/0317840 A1 | 11/2018 | Ben-Kiki et al. |
| 2018/0344242 A1 | 12/2018 | Ben-Kiki et al. |
| 2019/0156358 A1 | 5/2019 | Pace |
| 2020/0034421 A1 | 1/2020 | Ferrucci et al. |
| 2020/0099740 A1 | 3/2020 | Ben-Kiki et al. |

FOREIGN PATENT DOCUMENTS

| | | |
|---|---|---|
| CN | 103400054 A | 11/2013 |
| WO | WO-0122384 A1 | 3/2001 |
| WO | WO-2010144766 A1 | 12/2010 |
| WO | WO-2012094516 A1 | 7/2012 |
| WO | WO-2013059290 A1 | 4/2013 |

OTHER PUBLICATIONS

"LSUN: Construction of a Large-Scale Image Dataset using Deep Learning with Humans in the Loop", by Yu et al., Princeton University. (Year: 2016).

Beun et al., "Improving Adherence in Automated e-Coaching", International Conference on Persuasive Technology, PERSUASIVE 2016: Persuasive Technology pp. 276-287. (Year: 2016).

Canadian Office Action dated Apr. 16, 2019 for corresponding Canadian Application 2,949,605 filed Nov. 18, 2016 (4 pages).

Canadian Office Action dated Apr. 30, 2020 for corresponding Canadian Application 2949605, filed Nov. 18, 2016 (9 pages).

Chinese Office Action dated Aug. 14, 2018 in corresponding Chinese Application 201480041214.1 filed Jan. 20, 2016 (5 pages).

Chinese Office Action dated Aug. 24, 2017 in corresponding Chinese Application 201480041214.1 filed Jan. 20, 2016 (7 pages).

Chinese Office Action dated Mar. 14, 2019 in corresponding Chinese Application 201480041214.1 filed Jan. 20, 2016 (10 pages).

Chinese Office Action dated Sep. 29, 2019 in corresponding Chinese Application 201480041214.1 filed Jan. 20, 2016 (8 pages).

Ciaramicoli, "What is Empathic CBT", <https://web.archive.org/web/20161014010605/http://www.balanceyoursuccess.com/what-is-empathic-cbt/> (Year: 2016).

European Examination Report for Application No. 14801490.5 dated Oct. 22, 2019.

European Search Report for Application No. 18835438.5 dated Mar. 15, 2021.

European Search Report for Application No. 18835919.4 dated Mar. 15, 2021.

European Search Report for European Application No. 19847959.4 dated Mar. 25, 2022.

International Preliminary Report on Patentability for International Application No. PCT/US2018/041603 dated Jan. 21, 2020.

International Preliminary Report on Patentability for International Application No. PCT/US2018/042272 dated Jan. 30, 2020.

International Search Report and Written Opinion for International Application No. PCT/US2019/036972 dated Sep. 23, 2019.

International Search Report and Written Opinion for International Application No. PCT/US2020/053820 dated Jan. 14, 2021.

International Search Report dated Nov. 6, 2014, which is enclosed, that issued in the corresponding European Patent Application No. PCT/US2014/039022.

Mccallum, Simon "Gamification and serious games for personalized health". 2012. Publisher. Studies in health technology and informatics. (Year: 2012).

The above foreign patent documents were cited in a Nov. 23, 2016 European Search Report, which is enclosed, that issued in European Patent Application No. 14801490.5.

The above references were cited the International Search Report of International Application No. PCT/US2018/041603 dated Nov. 8, 2018, which is enclosed.

The above references were cited the International Search Report of International Application No. PCT/US2018/042272 dated Nov. 29, 2018, which is enclosed.

U.S. Appl. No. 17/494,407, filed Oct. 5, 2021, Tomer Ben-Kiki.
U.S. Appl. No. 17/510,341, filed Oct. 25, 2021, Ran Zilca.
U.S. Appl. No. 16/059,498, filed Aug. 9, 2018, Tomer Ben-Kiki.
U.S. Appl. No. 17/060,831, filed Oct. 1, 2020, Ran Zilca.

* cited by examiner

SYSTEMS AND METHODS FOR DYNAMIC USER INTERACTION FOR IMPROVING MENTAL HEALTH

CROSS-REFERENCE TO RELATED APPLICATIONS

This application is a continuation of U.S. Non-Provisional Application Serial No. 15/974,978, filed May 9, 2018, which claims priority under 35 U.S.C. § 119(e) to U.S. Provisional Application Serial Nos. 62/656,231, filed on Apr. 11, 2018 and 62/533,423, filed on Jul. 17, 2017. This application is also a continuation-in-part of U.S. Non-Provisional Application Serial No. 14/284,229, filed on May 21, 2014, which claims priority under 35 U.S.C. § 119(e) to U.S. Provisional Application Serial No. 61/825,742, filed on May 21, 2013. This application is also a continuation-in-part of U.S. Non-Provisional Application Serial No. 14/990,380, filed on Jan. 7, 2016, which claims priority under 35 U.S.C. § 119(e) to U.S. Provisional Application Serial No. 62/101,315, filed on Jan. 8, 2015. The entire contents of each above-noted application is herein incorporated by reference in their entirety.

FIELD OF INVENTION

The present invention is directed to a computing system, and a process carried out by such system, for simulating human cognitive functions. More specifically, the present invention is directed to a computing system and a technologically implemented method for dynamically interacting with a user for the purpose of improving the user's happiness level by demonstrating empathy during such interaction in order to cause, during such interaction in order to cause, among other things, a higher level of engagement by the human with the computing system.

BACKGROUND

There are a multitude of programs designed to improve physical, emotional and/or psychological well-being of a person. These programs are offered through a number of channels, ranging from live in-person classes or sessions to online/offline media. Software applications executed on a mobile device (mobile applications) such as a smartphone have been developed to likewise engage users to improve their physical and/or psychological well-being. Some mobile applications employ an interactive model that adapts to a user's behavior over time and seek to serve as "virtual coaches" or "virtual psychotherapists" that guide the user to achieve a desired goal.

However, existing mobile applications or other types of software applications (e.g., executed on a general-purpose computer, tablet, smartphone, etc.) that seek to modify or improve the behavior and/or the psychological well-being of users often fail to achieve the desired results due to low or very low levels of engagement by the users with such applications. This problem is exacerbated for software applications that require or otherwise entail extended or sustained usage. Accordingly, the resulting low level of engagement leads to lack of commitment by users that, in turn, inevitably leads to failure in achieving the goals desired by those users. Even during usage of these applications, low level of engagement leads to reduced efficacy that, in turn, leads to a highly suboptimal improvement in well-being.

OBJECTS AND SUMMARY OF THE INVENTION

In view of the foregoing, it is an object of the present invention to provide a computing system/method for interacting with users for modifying their behavior and/or the psychological well-being, particularly for improving levels of happiness, which may further constitute alleviation and reduction of symptoms of mental health conditions such as depression and anxiety, wherein such interaction is implemented in a manner that causes a high level of engagement with users.

It is another object of the present invention to provide a computing system/method for interacting with users for the purpose of improving levels of happiness in which such interaction entails engaging by the computing system with users in a manner(s) that simulates human emotion and/or human cognitive skill, such as empathy, in order to beneficially result in a high level of engagement by the users and better efficacy of the overall interaction, leading to higher increases in the behavior and/or the psychological well-being of the users.

In accordance with an embodiment of the present invention, a computing system for interacting with users is provided, in which the computing system commences an interactive session with a user, receives input data from the user during the interactive session, analyzes the received input data and outputs a response to the user to continue the interactive session with the user. The computing system further, prior to outputting the response, identifies one or more topics from the received input data, ascertains a tone of the received input data, generates a mirroring prompt based on the ascertained tone of the received input data, and outputs to the user the generated mirroring prompt such that the outputting of the mirroring prompt during the interactive session causes an increase in a level of engagement of the user with the interactive session.

As an aspect of the present invention, the computing system generates a mirroring prompt that is indicative of identified one or more topics and reflective of an ascertained tone.

As another aspect, the computing system generates a mirroring prompt that is of an appropriate tone in responding to an ascertained tone.

As a further aspect, the computing system includes a database storing a plurality of selectable mirroring prompts and generates a mirroring prompt by selecting at least one of the stored selectable mirroring prompts.

As yet another aspect, the computing system generates a mirroring prompt using natural language generation techniques.

As yet a further aspect, the computing system includes a communication device capable of communicating with an external computer, obtains information about identified one or more topics from the external computer via the communication device, and generates a mirroring prompt using the obtained information.

As a feature of this aspect, the obtained information includes current information pertaining to the identified one or more topics accessible via the Internet.

As still yet another aspect, the computing system includes at least one sensor being adapted to obtain supplemental user data and generates a mirroring prompt at least in part on the obtained supplemental user data.

As still yet a further aspect, the computing system commences an interactive session with a user, the interactive session being part of a happiness track selected by the user and generates and outputs a mirroring prompt to the user during the interactive session to cause an increase in a level of happiness of the user in accordance with the selected happiness track.

In accordance with another embodiment of the present invention, a method for a computing system to interact with users is provided, in which the computing system comprises at least one processor, and the inventive method comprises commencing, by the at least one processor, an interactive session with a user, receiving, by the at least one processor, input data from the user during the interactive session, analyzing, by the at least one processor, the received input data, and outputting, by the at least one processor, a response to the user to continue the interactive session with the user, wherein prior to outputting the response, the at least one processor: identifies one or more topics from the received input data, ascertains a tone of the received input data, generates a mirroring prompt based on the ascertained tone of the received input data, and output to the user the generated mirroring prompt, and wherein the outputting of the mirroring prompt to the user during the interactive session causes an increase in a level of engagement of the user with the interactive session.

As an aspect of this embodiment, the method comprises generating, by the at least one processor, a mirroring prompt that is indicative of identified one or more topics and reflective of an ascertained tone.

As another aspect, the method comprises generating, by the at least one processor, a mirroring prompt that is of an appropriate tone in responding to an ascertained tone.

As a further aspect, the method comprises storing, by the at least one processor, a plurality of selectable mirroring prompts in a database and generating, by the at least one processor, a mirroring prompt by selecting at least one of the stored selectable mirroring prompts.

As yet another aspect, the method comprises generating, by the at least one processor, a mirroring prompt using natural language generation techniques.

As yet a further aspect, the computing system comprises at least one processor and a communication device capable of communicating with an external computer, and the inventive method comprises obtaining, by the at least one processor, information about identified one or more topics from the external computer via the communication device, and generating, by the at least one processor, a mirroring prompt using the obtained information.

As a feature of this aspect, the obtained information includes current information pertaining to the identified one or more topics accessible via the Internet.

As still yet another aspect, the computing system comprises at least one processor and at least one sensor being adapted to obtain supplemental user data, and the inventive method comprises generating, by the at least one processor, a mirroring prompt at least in part on the obtained supplemental user data.

As still yet a further aspect, the method comprises commencing, by the at least one processor, an interactive session with a user, the interactive session being part of a happiness track selected by the user and generating and outputting, by the at least one processor, a mirroring prompt to the user during the interactive session to cause an increase in a level of happiness of the user in accordance with the selected happiness track.

In accordance with a further embodiment of the present invention, a computing system for interacting with users is provided, in which the computing system commences an interactive session with a user, the interactive session being part of a happiness track selected by the user, receives input data from the user during the interactive session, analyzes the received input data, and outputs a response to the user to continue the interactive session with the user. The computing system further, during the interactive session, identifies one or more topics from the received input data and determines whether to output an option to the user for switching to a different happiness track.

As an aspect of this embodiment, the computing system determines to output an option to a user for switching to a different happiness track when relevance of identified one or more topics to a selected happiness track is not greater than a threshold.

As a feature of this aspect, the computing system determines to output an option to a user for switching to a different happiness track when identified one or more topics having relevance not greater than a threshold is detected a plurality of times.

As another aspect, the computing system determines to output an option to a user for switching to a different happiness track based on tone of received input data.

In accordance with yet another embodiment of the present invention, a method for a computing system to interact with users is provided, in which the computing system comprises at least one processor, and the inventive method comprises commencing an interactive session with a user, the interactive session being part of a happiness track selected by the user, receiving input data from the user during the interactive session, analyzing the received input data, and outputting a response to the user to continue the interactive session with the user. The method further comprises, during the interactive session, identifying one or more topics from the received input data and determining whether to output an option to the user for switching to a different happiness track.

As an aspect of this embodiment, the method comprises determining to output an option to a user for switching to a different happiness track when relevance of identified one or more topics to a selected happiness track is not greater than a threshold.

As a feature of this aspect, the method comprises determining to output an option to a user for switching to a different happiness track when identified one or more topics having relevance not greater than a threshold is detected a plurality of times.

As another aspect, the method comprises determining to output an option to a user for switching to a different happiness track based on tone of received input data.

These and other objects, advantages, aspects and features of the present invention are as described below and/or appreciated and well understood by those of ordinary skill in the art.

DETAILED DESCRIPTION

The present invention is an interactive computing system, as well as a method employed by a technological device, that provides an environment for interacting with a (human) user in a manner that results in a high level of engagement with that user for the purpose of increasing the level of happiness of that user.

In general, and as described in greater detail herein, the computing system is configured to provide and engage the user in a set of activities and tasks particularly designed and selected for that user to increase the user's level of happiness. In accordance with the present invention, the computing system dynamically responds to the user's actions and feedback, which result from the user's partial or full performance of certain activities and tasks, and such dynamic responding by the computing system entails interaction that includes demonstration of simulated human emotion and/or human cognitive skill, such as empathy. As will be further described, interaction that includes demonstration of simulated human emotion and/or human cognitive skill results in a more personal and in-context environment with the user, mimicking a human-to-human conversation that, in turn, results in a manner of guiding the user that leads to achieving the desired goal.

Figure 1:
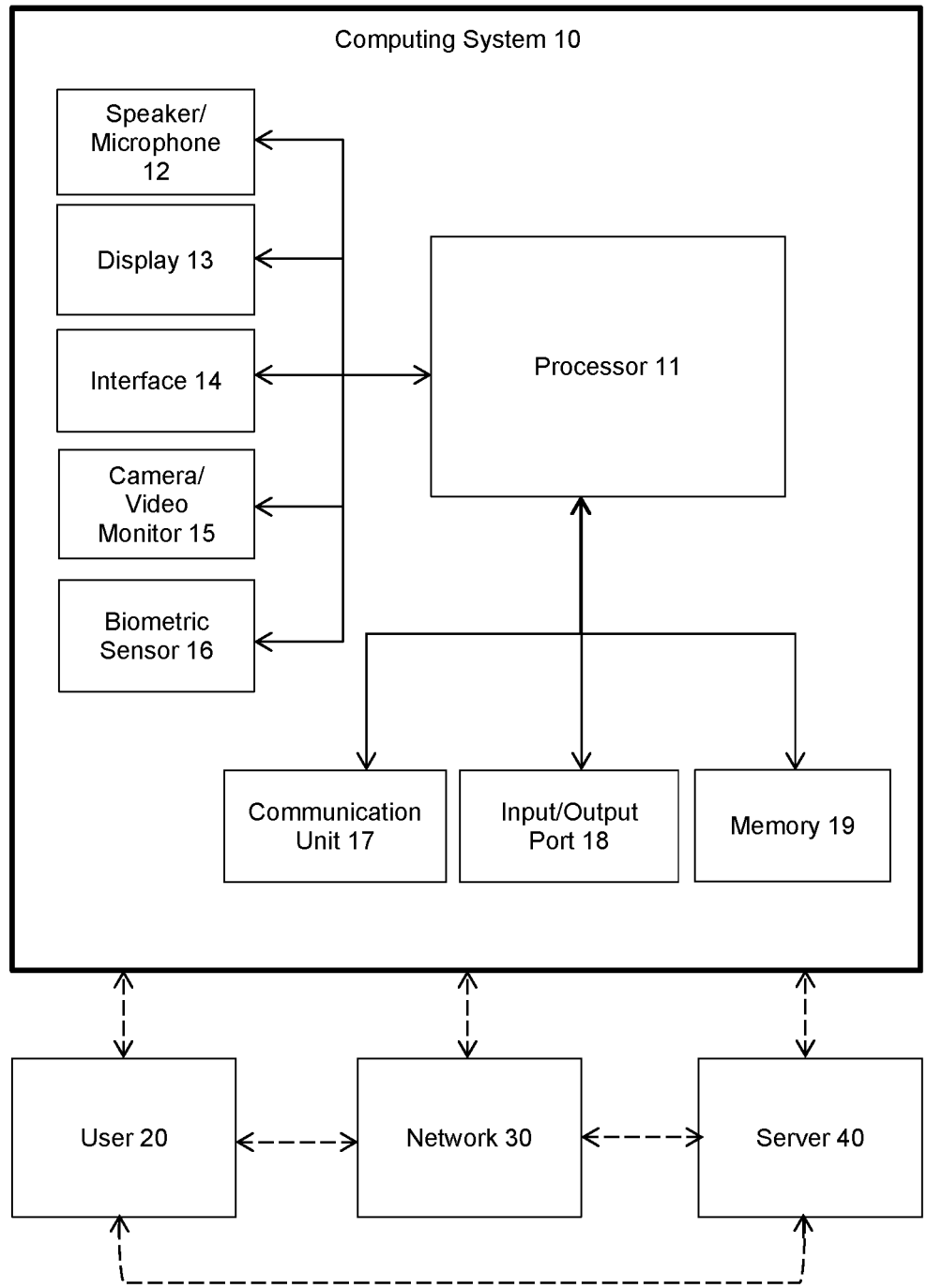
FIG. 1 is a block diagram of an exemplary computing system in accordance with the present invention.

Referring now to the drawings in which like numerals represent the same or similar elements, and initially to FIG. 1 thereof, a computing system 10 configured in accordance with the present invention is illustratively shown in accordance with one embodiment. The computing system 10 includes one or more processors 11 that processes various input data and stored data and controls operations of other components within the computing system 10 to enable herein described dynamic interaction between a user or users 20 and the computing system 10. As will be further described, the processor 11 processes data by performing numerous mathematical algorithms and analytical computations. The processor 11 may also be a plurality of processing units that each carries out respective mathematical algorithm and/or analytical computation. As will also be further described, the processor 11 is enhanced by artificial intelligence. The computing system 10 further includes a speaker/microphone 12, a display 13, an interface 14, a camera/video monitor 15 and a biometric sensor 16. The computing system 10 receives input data either directly from the user 20 or obtains input data (e.g., visual, acoustic, biometric, etc. data of the user 20) via one or more of the components above and the processor 11 analyzes the user input data. For example, the camera/video monitor 15 may be used to obtain visual data (e.g., still or moving image for capturing facial expression or other bodily gestures) of the user 20 or the biometric sensor 16 may be used to obtain biometric data (e.g., heart rate (HR), heart rate variability (HRV), brainwave, etc.) of the user 20 while the user is engaged in an activity or a task. Once the processor 11 analyzes the input data, the computing system 10 provides an appropriate response to the user 20 via the speaker 12 or the display 13. The response as described herein may comprise a prompt, an answer to a question, a follow up question, a suggestion, an advice, a general statement, etc. The method of responding to the user 20 may include, for example, synthetic speech, a visual avatar, typed or printed words, etc.

The computing system 10 further includes a communication unit or device 17, an input/output port 18 and a memory 19. The communication unit 17 allows the computing system 10 to communicate with the user's other electronic devices or with additional sensors within a vicinity of the user over a network 30. The network 30 may include wireless communications, wired communications, etc. The network 30 may include the Internet, a wide area or local area network, etc. The computing system 10 may use the I/O port 18 for inputting and outputting data. The computing system 10 includes the memory 19 which stores programs and applications.

The computing device 10, as well as the user's other electronic devices or the additional sensors, may be part of or otherwise be connected to the network 30 and coupled to a server or a service provider 40. The broken lines in FIG. 1 signify that the user 20, the network 30, the server 40 and the computing system 10 may be connected to any one or more of the user 20, the network 30, the server 40 or the computing system 10, either directly, indirectly, or remotely over a communication path. One or more of the computing system 10, the network 30 and the server 40 may be located on one computer, distributed over multiple computers, or be partly or wholly Internet-based.

In certain embodiments of the present invention, the computing system 10 embodies a service of various treatment and prevention disciplines, such as positive psychology, cognitive behavioral therapy, mindfulness, stress reduction, etc. One exemplary service is referred to herein for convenience as "Happify." Happify is a novel, science-based online service for engaging, learning and training the skills of happiness. Happify is based on a framework developed by psychologists and researchers in a collection of therapeutic disciplines such as Cognitive Behavioral Therapy, Mindfulness, Positive Psychology etc., and assists users in the development of certain skills related to being happy, for example, Savor, Thank, Aspire, Give and Empathize (or S.T.A.G.E.™) In certain embodiments, each skill is developed using various activities, ordered in increasing skill level, that gradually unlock as the user progresses in building that skill. With Happify, a user selects a "track" that contains sets of activities that are designed to address a specific life situation or goal.

The Happify system may be implemented on a user's mobile electronic device, such as a smartphone or tablet, or may be implemented on the user's personal computer (PC). Happify may be embodied within a mobile application, an executable software program, or another suitable form. For instance, a user may download and install a mobile application that provides the Happify service. The user, via the mobile application, selects a Happiness track and is provided with a set of activities that are designed to improve the user's happiness level in accordance with the selected track.

As the user performs one or more of these activities, the Happify system assesses and re-assesses the user's physical and emotional states using various tools. For instance, there may be a plurality of sensors (e.g., biometric) that are placed within a vicinity of the user (e.g., in wired and/or wireless communication with the user's smartphone) that extract biometric information from the user while the user is engaged in an activity or a task. Examples of such extracted biometric information are heart rates, heart rate variability, brainwaves, body heat, pupil dilations, etc. In another instance, one or more sensor mechanisms within the user's smartphone (e.g., speaker, camera, microphone, buttons, keys, etc.) are used to capture user information. Examples of such captured information are recorded speech, typed texts, facial expression, etc. In a further instance, the user's physical or emotional states may be assessed from self-reports such as questionnaires. In other instances, a mix of foregoing information may be used concurrently to assess the user's physical or emotional states.

In accordance with the Happify system, the extracted, captured and/or otherwise provided information are processed to analyze the user's feelings including, but not limited to, the user's reaction, the user's engagement level, the user's adherence level, the change in the user's psychological state, etc. in regards to the performed, or partially performed, Happify activities. Processing may be carried out within the Happify application or by another processing unit that resides within the smartphone (or tablet or other computing system). Alternatively, the extracted and/or captured information are transmitted and processed remotely by a server (or other remote electronic device). In any of these versions, processing includes application of select mathematical algorithms and analytical computations on user input data obtained while the user performs the activities. The processing ultimately results in providing of select follow up activities that further enhance development of the happiness skill in order to achieve the desired outcome.

In further accordance with the Happify system, the processing of data and/or the providing of follow-up activities is ongoing. In particular, as the user performs the provided activity, the Happify system continually monitors and interacts with the user to obtain ongoing real-time information. For example, the ongoing real-time information may be a user's response to a question, what the user has done in response to a task, or various other biometric information of the user obtained from the sensor(s) placed within a vicinity of the user. With such real-time or aggregate analysis, the user's interaction with the Happify system becomes more dynamic and results in higher levels of engagement as that interaction continues.

Further details of the Happify system and operation of the Happify system are set forth in U.S. patent application Ser. No. 14/284,229, entitled "SYSTEMS AND METHODS FOR PROVIDING ON-LINE SERVICES" and U.S. patent application Ser. No. 14/990,380, entitled "DYNAMIC INTERACTION SYSTEM AND METHOD," and the entire contents of each of these applications is incorporated herein by reference. For the sake of brevity, further details of the Happify system/service are not provided herein (except as otherwise described herein).

Empathy

In accordance with the present invention, the computing system further dynamically responds to the user's actions and feedback by demonstrating simulated human emotion and/or human cognitive skill. In certain embodiments to be discussed, the computing system is configured to demonstrate empathy.

In further accordance with the present invention, a computing system is equipped or otherwise programmed with artificial intelligence for simulating a variety of human emotion and cognitive functions. For purposes herein, the term artificial intelligence (AI) means a machine or device suitably adapted or programmed in a manner sufficient so that the machine or device perceives its environment (or the desired environment) and takes actions that maximize its chance of successfully achieving its intended goals, as well as processes carried out by such machines or devices. The term AI can further mean the ability to learn from data and generalize unseen data by a machine. Display of artificial intelligence by a computing system generally includes performance of tasks that normally require a human intelligence. Various embodiments of the present invention are directed to demonstration of artificial "emotional" intelligence, which is a particular subset of human intelligence.

The field of artificial intelligence draws upon various diverse fields, such as computer science, mathematics, psychology, linguistics, philosophy and many others. In more recent years, AI has progressed to the point of understanding (at least from the machine's perspective) the aspect of human intelligence that is known as emotional intelligence, e.g., empathy. The term "empathy" generally is defined as the (human) ability to understand and share the feelings of another. In other words, empathy is the capacity to understand or feel what another person is experiencing from within the frame of reference of the other person. With recently developed AI emotion models, machines can now be programmed to learn when and how to display emotion in ways that enable the machine to appear empathetic or otherwise emotionally intelligent.

In accordance with the present invention, the above discussed Happify system further interacts and engages with users in an empathetic and supportive manner to provide certain benefits as herein described. The system/process of the present invention, therefore, in certain embodiments, is capable of emotional intelligence and with such emotion intelligence, conveys empathy to users of the system to keep the user advantageously engaged over time.

Mirroring Prompt

In certain embodiments, the inventive system includes artificial intelligence sufficient to provide the system with a so-called "mirroring" ability. As described herein, the inventive system in such certain embodiments employs various algorithms, such as topic analysis, natural language classification, etc. to reflect back on input received from the user and/or measurement data collected from the user, and then responds to the user with context-based responses.

In each of the embodiments described herein in which AI is employed by the inventive computing system to convey or simulate emotional intelligence, the environment presented to the user beneficially is human-like from the perspective of the user that results in a more rewarding or engaging environment to the user that, in turn, results in greater engagement by the user that, in turn, results in a far greater chance of success in the ultimate goal of achieving a greater level of happiness.

Figure 2:
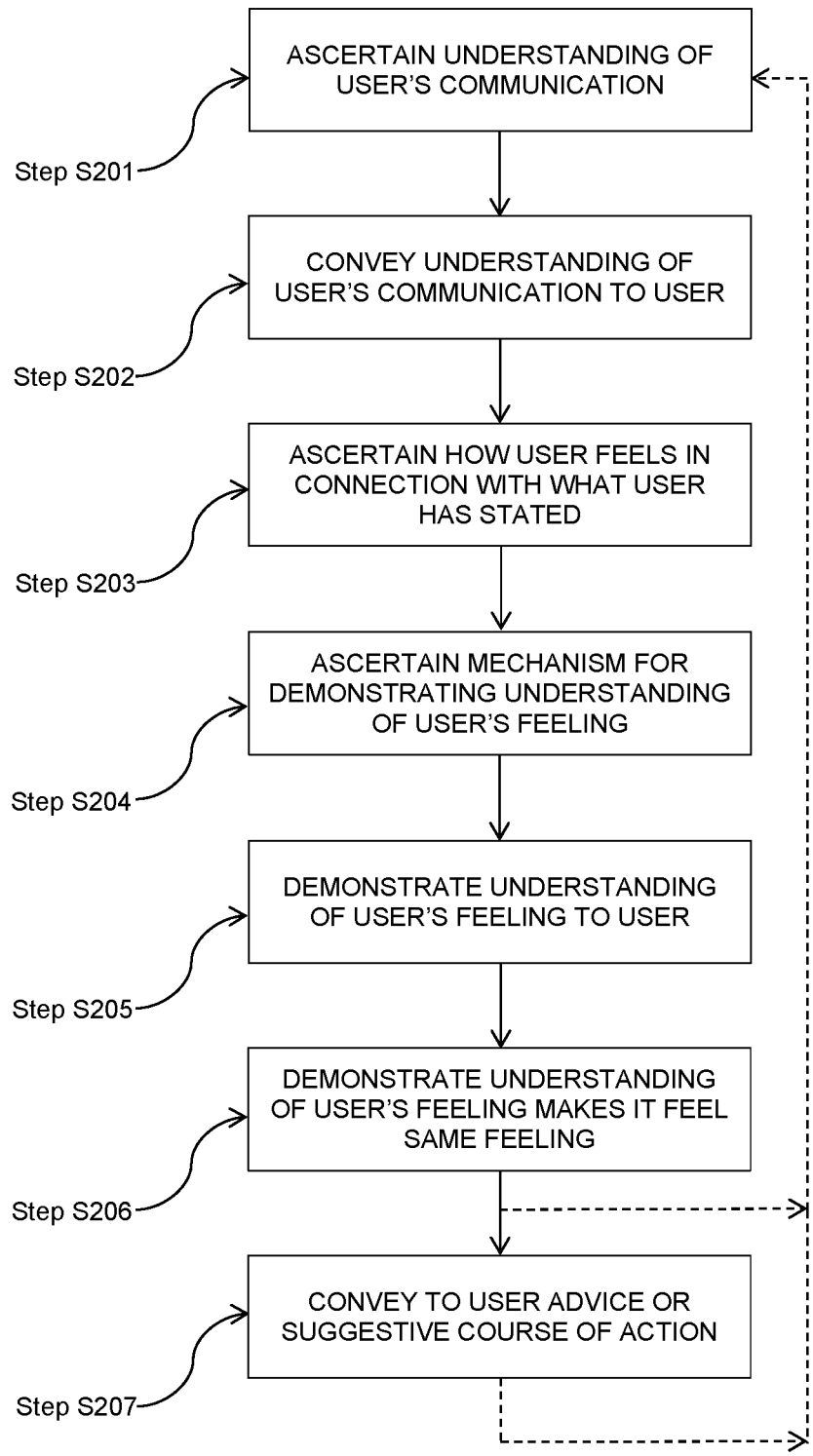
FIG. 2 is an exemplary flowchart including steps for simulating conveyance of empathy by the exemplary computing system in accordance with the present invention.

FIG. 2 is a flowchart that shows the various steps that the inventive computing system of the present invention employ to convey, or to simulate conveyance of, empathy. In accordance with an exemplary embodiment of the present invention, the steps shown in FIG. 2 are implemented at various times during interaction with the user. In accordance with another exemplary embodiment of the present invention, the steps are carried out at each and every turn of a dialogue during interaction with the user. For convenience herein, interaction with the user is also referred to herein as an interactive session.

During an interactive session, the inventive computing system receives user input data while an activity is in progress. As shown in FIG. 2, the process of demonstrating empathy by mirroring begins with the computing system ascertaining an understanding of the user's communication (Step S201). This step entails multiple sub-steps/processes to be described. After ascertaining understanding of the user's communication, the computing system may, optionally, convey to the user an indication that it understands the user's communication (Step S202). Thereafter, the computing system ascertains how the user feels in connection with what the user has stated (i.e., communicated to the computing system) (Step S203). This step entails, for example, understanding the tone of the user's communication. In other words, in addition to understanding "what" is said (or a topic of conversation), the computing system performs analysis to gain an understanding of "how" the user delivered such communication or what other descriptive words form part of that communication.

After gaining an understanding of how the user feels, the computing system ascertains a mechanism for demonstrating that it understands how the user feels (Step S204). This may be conveyed in several ways (e.g., mirroring, as further discussed). The computing system then demonstrates to the user, via such mechanism, that it understands how the user feels (Step S205). Thereafter, the computing system ascertains and demonstrates (Step S206) that it understands how the user feels and this makes it feel the same feeling, much like mirroring of facial expression. Once the process reaches this point, the computing system may repeat the above steps for the next communication from the user.

Empathy is conveyed by the computing system by demonstrating that it understands the situation that the user is in (i.e., the context of the feeling) and simulating that it has been in that situation also. Completion of the above described steps results in a successful simulation of human emotion empathy by the computing system. Then, if deemed appropriate, the computing system ascertains and then conveys to the user advice or a suggestive course(s) of action to address the statements and feelings conveyed by the user or to bring about an improvement with respect to the user's particular emotional state (Step S207). The process may then be repeated again for the user's next communication.

In accordance with the present invention, the "next" step in the interaction may depend on what rules have been set in regards to the provided activity. For example, the mirroring stage may be performed in a loop until the computing system decides to move onto the next question to ask. As another example, the next step may be based on the user's input. As a further example, the mirroring stage may be an interim stage that may be used at each "turn" of the interaction and the determination for the next turn may be based on adherence fidelity. Additional details of the adherence fidelity feature of the present invention is provided in the U.S. Provisional Application Ser. No. 62/533,423, filed on Jul. 17, 2017, the entire content of which is incorporated herein by reference.

Each of the steps briefly mentioned above and shown in the flowchart of FIG. 2 is further explained below.

The mechanism of mirroring entails maintaining the same flow of interaction with the user and including an appropriate "mirroring prompt" in the interaction. For example, when two people communicate, it has been scientifically researched that their brains tend to get activated in similar regions. This effect is also known as "brain mirroring." See "Brain Basis of Human Social Interaction: From Concepts to Brain Imaging" by Hari, R., & Kujala, M. V., Physiological Reviews, 89(2), 453-479 (2009) for additional detail on brain mirroring, the content of which is incorporated herein by reference.

In accordance with an exemplary computing system of the present invention, the anatomy of a mirroring prompt can be outlined as follows: (1) Reflecting the content of what the user just said; (2) Using an understanding and supportive tone; (3) Using an emotional tone that is similar to the emotions the user conveyed or an emotional tone that is appropriate for the emotions the user conveyed; and (4) Addressing the context or situation that the user mentioned. The mirroring prompt demonstrates that the computing system "feels" what the user is feeling and, naturally, responds in a similar tone, mirrors the content of the conversation, conveys commiseration, etc.

An example of the effect of a mirroring prompt when incorporated into a conversation between the user and the computing system is shown by the interaction in Table 1 below.

TABLE 1

| With Mirroring | |
|---|---|
| Computer | > What is one great thing that happened to you today? |
| User | >> I went for a walk in the park next to my house. It's October now and the trees were in beautiful colors. I felt so connected. |
| Computer | > That sounds awesome! Being in nature often makes us feel like we are part of something greater. |
| Computer | > Thanks! What is another good thing you experienced today that you can share? |

For illustrative purposes, Table 2 below shows an exemplary conversation between the user and the computing system but without a mirroring prompt.

TABLE 2

| Without Mirroring | |
|---|---|
| Computer | > What is one great thing that happened to you today? |
| User | >> I went for a walk in the park next to my house. It's October now and the trees were in beautiful colors. I felt so connected. |
| Computer | > Thanks! What is another good thing you experienced today that you can share? |

As illustrated above, in response to the initial question, the user has described an activity of being in nature (e.g., walk in the park) and has expressed enthusiasm (e.g., felt connected). With mirroring, an extra response (i.e., the mirroring prompt) reflects on the content of what the user just said (e.g., "being in nature" is reflective of "walk in the park"), contains an understanding and supportive tone (e.g., use of terms such as being "part of" something greater shows understanding and supports user's enthusiastic expression of feeling "connected" with nature), delivers an emotional tone that is similar to the emotions the user conveyed (e.g., "That sounds awesome!"). With mirroring, the level of conversation between the user and the computing system has increased because the user feels more appreciated in the conversation. Mirroring by the computing system attempts to show the user that the user is really being listened to and each and every spoken word is being appreciated, as if the computing system were just another human being in a conversation. With mirroring, the conversation is therefore more friendly and personal, and the user feels more engaged in the conversation.

Another example of the mirroring prompt in a conversation employed by the present invention is shown in Table 3.

TABLE 3

| With Mirroring | |
|---|---|
| Computer | > What are some of the challenges you face in your attempt to achieve this goal? |

TABLE 3-continued

With Mirroring

| User | >> I just cannot find the energy to enroll in any classes, not sure why. |
|---|---|
| Computer | > Yes, going back to school can be hard, and everyone feels drained from time to time. |
| Computer | > What ways can you think about that will help you overcome this challenge? |

Table 4 below shows this conversation without a mirroring prompt.

TABLE 4

Without Mirroring

| Computer | > What are some of the challenges you face in your attempt to achieve this goal? |
|---|---|
| User | >> I just cannot find the energy to enroll in any classes, not sure why. |
| Computer | > What ways can you think about that will help you overcome this challenge? |

As illustrated in the example shown in Tables 3 and 4, the user has described a situation of enrolling in courses, implying that the user is discussing an educational program, and the tone was that of low energy and frustration. Without mirroring, the computing system jumps to providing the user with solutions. However, with mirroring, the system has employed a mirroring prompt using a similar tone to reflect back "going back to school" and "feeling drained," while mentioning that "everyone" feels drained from time to time, thus showing that it understands how the user is feeling. Again, similar to the first example, the user feels more appreciated and engaged with the conversation when mirroring is implemented.

As illustrated in the examples above, the process of providing a mirroring prompt by the computing system includes multiple components. The first part of generating a mirroring prompt is to identify and understand the contents of a conversation. As also illustrated in the flowchart of FIG. 2, ascertaining an understanding of the user's communication is the first step in demonstrating empathy. The object of this step is to enable the computing system to understand what it is the user has said, wrote or typed in response to an inquiry.

As such, to better identify and understand the contents of the conversation, the computing system employs a set of techniques such as natural language classification, topic modeling, sentiment analysis, named entity extraction, emotion detection, etc. The list is not exhaustive and the computing system may employ additional techniques as necessary to identify and understand a broad spectrum of topics. The series of steps in applying various analytic techniques is also referred to herein as the computing system training a "classifier."

In accordance the present invention, the computing system may initially carry out a series of offline steps such as running topic modeling or a similar language modeling technique to identify themes that exist in previously accumulated data stored, for example, in the memory 19. As used herein, the term "previous data" refers to various previously recorded conversations between the user and the computing system, or pre-recorded data from different users. For instance, the computing system can retract data from the Happify business-to-consumer (B2C) database. However, in accordance with the present invention, as the computing system continues to interact with the user, additional data are collected which in turn can be used to retrain and refine these topic models (i.e., as the invention is being used, it produces additional training data).

Various details of topic or language modeling techniques that may be employed in certain embodiments of the present invention are not described, but rather are sufficiently and well understood in the art. Those details that are well known and understood are not described herein for brevity. Various publications that describe such techniques that may be employed herein include: "Probabilistic Topic Models" by Blei, D. M., Communications of the ACM, 55(4), 77-84, (2012); "Utopian: User-Driven Topic Modeling based on Interactive Nonnegative Matrix Factorization" by Choo, J., Lee, C., Reddy, C. K., & Park, H., IEEE Transactions on Visualization and Computer Graphics (Volume: 19, Issue: 12, Dec. 2013); and "Hierarchical Topic Models and the Nested Chinese Restaurant Process" by Griffiths, T. L., Jordan, M. I., Tenenbaum, J. B., & Blei, D. M., Published in NIPS'03 Proceedings of the 16th International Conference on Neural Information Processing Systems, Pages 17-24 (Dec. 9-11, 2003), and each of these publications is incorporated fully herein by reference.

Next, the computing system runs additional clustering analyses to group together various themes and topics. For instance, this may require further grouping together themes and topics that may be facially different but nonetheless require a similar response to the user. For example, "working in the yard" and "being outdoors" may be grouped together as the mirroring prompt would be the same (e.g., "being outdoor is great!") regardless of whether the user is describing his or her effort in mowing the lawn or taking a leisurely walk in a park. Still further, this is particularly effective if the same response for different topics has the same psychological effect, as at the end of the day, the goal is to cater to the efficacy of a psychological intervention.

Once the reference data has been grouped into major themes via the steps described above, the computing system identifies the most representative text sample of the theme. The most representative text sample may be determined by scoring each text sample to assess its proximity or degree of match to each topic, and then using only the samples with the closest match (or top-scoring) as the most representative. For example, if a theme includes 5 different topics, the computing system may decide to take the top-scoring 100 text samples from each of the 5 topics (if voice or video data are used, then voice or video samples may be used).

Using these data, a text classifier is trained that can learn to distinguish between themes. For example, the text classifier can use features extracted from the text such as the topic scores or other language model scores (e.g., word2vec scores), and then use another classification algorithm (e.g., Bayesian classifier, support vector machine, deep learning, neural network, etc.) to learn to distinguish between the features. In a case where voice or video data are used, the computing system may further include A/V classification algorithms, such that the content beyond the text, such as the tone of the voice or the facial expression may also be used.

Some of the classification algorithms that are discussed above as being utilized by the Happify system are also known in the art. Details of the specifics of the known algorithms are omitted herein for brevity. Instead, below list demonstrates exemplary publications that are incorporated herein by reference that describe respective exemplary algorithms: "A Comparison of Event Models for Naive Bayes Text Classification" AAAI-98 Workshop on Learning for Text Categorization (Vol. 752, No. 1, pp. 41-48); and "word2vec Explained: deriving Mikolov et al.'s negative-sampling word-embedding method" Goldberg, Y., & Levy, O., arXiv:1402.3722 (2014).

Figure 3:
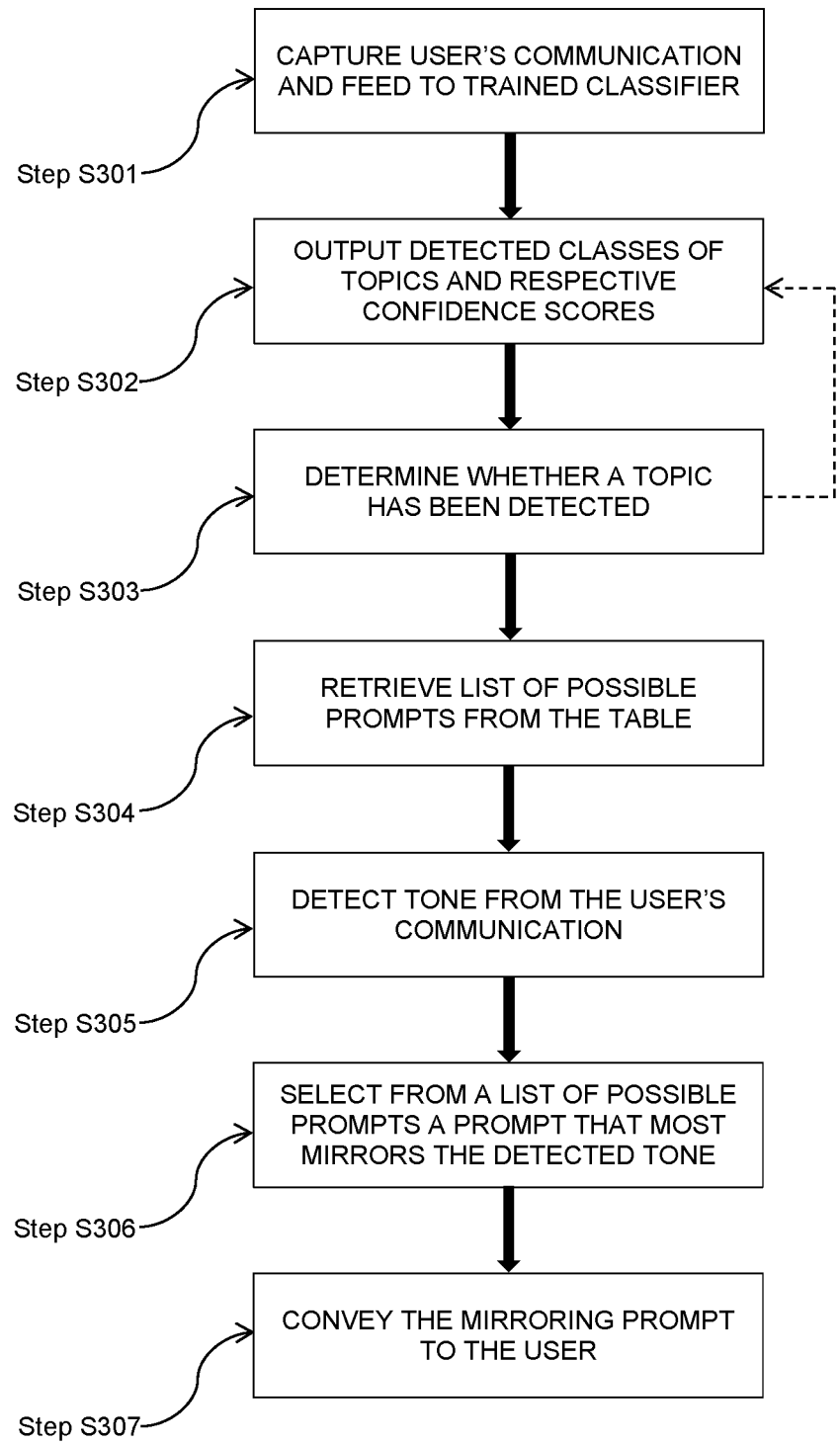
FIG. 3 is an exemplary flowchart explaining mirroring prompt feature of the present invention.

After identifying and understanding the contents of the conversation, and before responding to the user demonstrating the understanding of the content of the user's statements, the computing system must detect the "tone" of the user's statements and respond using an emotional tone that is similar to or appropriate for the tone the user has conveyed. This part of the process corresponds to the next several steps in the flowchart of FIG. 2. In particular, understanding and emulating the user's tone allows the computing system to demonstrate that it is aware of the user's feeling toward what is said and that understanding makes it feel the same feeling. The specifics of choosing the tone of the mirroring prompt are described in reference to FIG. 3.

First, during runtime, i.e., when an activity or a task to be performed has been presented to the user, the user may be asked a question. The answer's text (and potentially voice and video data) is then captured and fed into the classifier that has been trained in accordance with the steps disclosed above (Step S301). The classifier then returns a top class that it detects, with a confidence score for that class, and a number of sub classes, and their respective confidence scores (Step S302). Once the classifier outputs a result, the computing system applies a decision logic to the result to determine whether a topic has been detected or not (Step S303). Prior to applying the decision logic, the computing system may apply a threshold to the confidence scores in the result or normalize the confidence scores before applying the threshold. Optionally, if it is determined that a topic has not been determined, or if none of the detected topic includes a confidence score greater than a predetermined threshold, the process may return to the classifier detecting different classes. Alternatively, if computing system fails to determine a topic from the user's communication, the system may alert a need to update or retrain the classifier or opt to apply a different classification algorithm.

When it is determined that a topic is detected, the computing system refers to a reference table where possible prompts and/or responses for each topic are stored (Step S304). Taking the conversation between the user and the computer as shown in Table 3 as an example, when the computing system feeds to the trained classifier the statement "I just cannot find the energy to enroll in any classes, not sure why," topics that may be returned are, for example, "education," "enrolling in classes," "low energy," "uncertainty" etc., each with a respective confidence score. The reference table as mentioned above which the computing system refers to includes possible prompts and/or responses for each of these detected topics. Assuming that the topic "enrolling in classes" is returned as the topic with the highest confidence score, the reference table includes various possible prompts carrying different tones. For instance, one possible prompt is to be conveyed in an elated or thrilled tone, such as "signing up for new classes can be exciting!" or "you must be excited to meet new people in new classes!" Another possible prompt is to be conveyed in a concerned tone, such as "do you have a preferred field of study?" or "have you reviewed the list of classes available?" Yet another possible prompt is to be conveyed in a commiserative or supportive tone, such as "going back to school can be hard" or "it is such an effort to enroll in classes." Within the reference table, each of the possible prompts may be distinctly labeled (e.g., sad, angry, depressed, elated, joyous, tense, fearful, etc.).

In accordance with the present invention, selection of the mirroring prompt entails selecting from a list of prompts one that carries a tone that is most similar to the tone detected from the input data. In certain embodiments, the selection of the mirroring prompt entails selecting from a list of prompts one that is most appropriate in responding to the tone detected from the input data. For example, for each detected tone, there is a corresponding tone that is the most appropriate to respond with, such that it comes across as most empathetic. Typically, positive tones should be mirrored directly (e.g., elated for elated) but negative tones should be responded with support and a lower level of arousal (e.g., respond to angry tone with a soothing and calming tone). Therefore, the computing system first determines the tone of the user's statement based at least in part on the content of the user's response and/or the user's stored data regarding the same topic (Step S305). For instance, the computing system may ascertain an overall tone of the user's statement by analyzing the words surrounding the words that indicated a topic. As another instance, the computing system may ascertain the tone by employing a keyword matching algorithm. In the example above, the computing system may determine from the user's statement the topic "enrolling in classes," but also realize that the user has expressed "cannot find energy" or "not sure" within the same sentence. The computing system, based on these surrounding keywords, may come to a conclusion that the user may be depressed or concerned with enrolling in classes and select an appropriate mirroring prompt (e.g., "going back to classes can be hard.")

The computing system, in determining the tone from the user's statement, may also employ various tone assessment techniques. Details of the various tone assessment techniques employed in certain embodiments of the present invention are not described, but rather are sufficiently and well understood in the art. Those details that are well known and understood are not described herein for brevity. An exemplary tone analyzer in the market is the IBM Watson Tone Analyzer (see "IBM Watson Tone Analyzer—new service now available" by Akkiraju, R., also available at https://www.ibm.com/watson/services/tone-analyzer/ (2015), the description of which as disclosed in the above publication is incorporated herein by reference. Additional publications that describe tone assessment techniques that may be employed herein include: "Emotions from text: machine learning for text-based emotion prediction. In Proceedings of the conference on human language technology and empirical methods in natural language processing" by Alm, C. O., Roth, D., & Sproat, R., Association for Computational Linguistics, pp. 579-586, (October 2005); and "Feeler: Emotion classification of text using vector space model. In AISB 2008 Convention Communication, Interaction and Social Intelligence" by Danisman, T., & Alpkocak, A., Vol. 1, p. 53, (April 2008); "Learning to identify emotions in text. In Proceedings of the 2008 ACM symposium on Applied computing" by Strapparava, C., & Mihalcea, R., ACM, pp. 1556-1560, (March 2008). Each of the publications listed above is incorporated herein by reference.

In addition to tone assessment techniques, various other analyses may be performed on the user's statement to gain a deeper understanding of the user's emotion. For example, the computing system may perform sentiment analysis, personality analysis, or other analysis to detect emotion from human speech and facial expressions. In some embodiments, multiple engines may simultaneously run a series of these techniques on the user's statement. Each of these techniques is also rather sufficiently and well understood in the art. Those details that are well known and understood are not described herein for brevity. Various publications that describe sentiment analysis techniques that may be employed herein include: "Sentiment strength detection in short informal text" by Thelwall, M., Buckley, K., Paltoglou, G., Cai, D., & Kappas, A., Journal of the Association for Information Science and Technology, 61(12), 2544-2558 (2010); "Opinion mining and sentiment analysis" by Pang, B., & Lee, L., Foundations and Trends® in Information Retrieval, 2(1-2), 1-135 (2008); and "Sentiment analysis: Capturing favorability using natural language processing" by Nasukawa, T., & Yi, J., In Proceedings of the 2nd international conference on Knowledge capture, pp. 70-77, ACM, (October 2003). Various publications that describe personality analysis techniques that may be employed herein include: "The science behind the Personality Insights service [Online]" by Cloud, I. W. D., IBM Watson Developer Cloud; "The psychological meaning of words: LIWC and computerized text analysis methods" by Tausczik, Y. R., & Pennebaker, J. W., Journal of language and social psychology, 29(1), 24-54 (2010); and "Linguistic styles: Language use as an individual difference" by Pennebaker, J. W., & King, L. A., Journal of personality and social psychology, 77(6), 1296 (1999). See also "IBM Watson Personality Insights" available at https://www.ibm.com/watson/services/personality-insights. Various publications that describe emotion detection from human speech and facial expressions that may be employed herein include: "Analysis of emotion recognition using facial expressions, speech and multimodal information" by Busso, C., Deng, Z., Yildirim, S., Bulut, M., Lee, C. M., Kazemzadeh, A., & Narayanan, S., In Proceedings of the 6th international conference on Multimodal interfaces, pp. 205-211, ACM, (October 2004); "Hidden Markov model-based speech emotion recognition" by Schuller, B., Rigoll, G., & Lang, M., In Multimedia and Expo 2003 ICME'03 Proceedings, Vol. 1, pp. 1-401, (July 2003); "Emotion recognition from speech" by Rao, K. S., Kumar, T. P., Anusha, K., Leela, B., Bhavana, I., & Gowtham, S. V. S. K., International Journal of Computer Science and Information Technologies, 3(2), 3603-3607 (2012); and "Emotion recognition by speech signals" by Kwon, O. W., Chan, K., Hao, J., & Lee, T. W., In Eighth European Conference on Speech Communication and Technology (2003). Each of the publications listed above is incorporated herein by reference.

Once the user's tone has been identified, the computing system selects the most appropriate (or most similar-toned) prompt for mirroring the user's statement (Step S306). Finally, the system conveys the mirroring prompt to the user (Step S307).

As an alternative to choosing from a list of available prompts, once the user's tone or other characteristic has been identified, the computing system may synthesize a new prompt using natural language generation techniques. For example, using the entity "John," the relationship "brother," the topic "meal," the subtopic "dinner" and the tone "fun," the computing system may synthesize "Sounds like your brother John and you had a fun time during dinner!" As a further alternative, the computing system may draw from an inspirational quote or mention a fact from a research study. In some versions, the prompt may also be composed using real time query of online resources. For example, the prompt can be based on the variety of information that is available on the web. If it is detected that the user is describing a topic that happened recently, the computing system can go online to news websites and generate a prompt taking these events into account. In accordance with the present invention, generating a prompt with information that is based on recent event may be more effective in grabbing the user's attention. For instance, if the name of a rock band is continuously detected as a topic, providing a real time update on that rock band may serve to draw the user deeper into the conversation. Once the mirroring prompt is administered and played to the user, the computing system continues with the normal course of interaction with the user.

Additional examples of application of mirroring prompt in accordance with the foregoing discussions on: (1) identifying and understanding the contents of a conversation, and (2) identifying an emotional tone of the user's statement, are provided in screenshots shown in FIGS. 4A-4D.

Figure 4A:
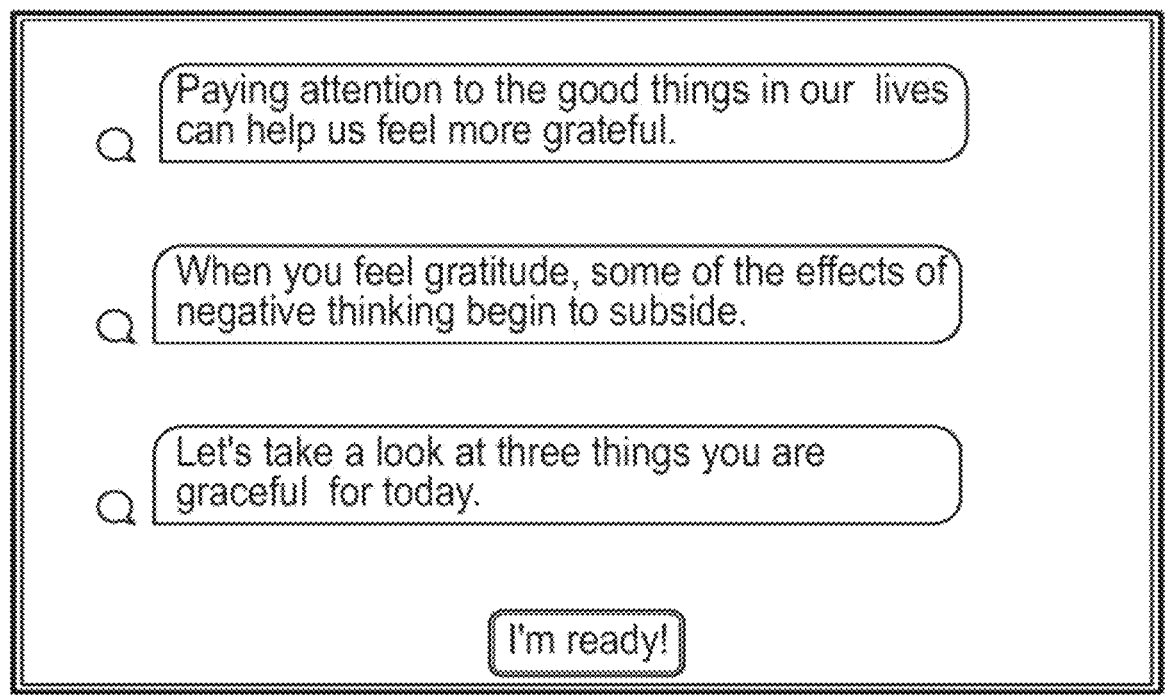
FIGS. 4A-4D are screenshots illustrating examples of application of the mirroring prompt in accordance with the present invention.
Figure 4B:
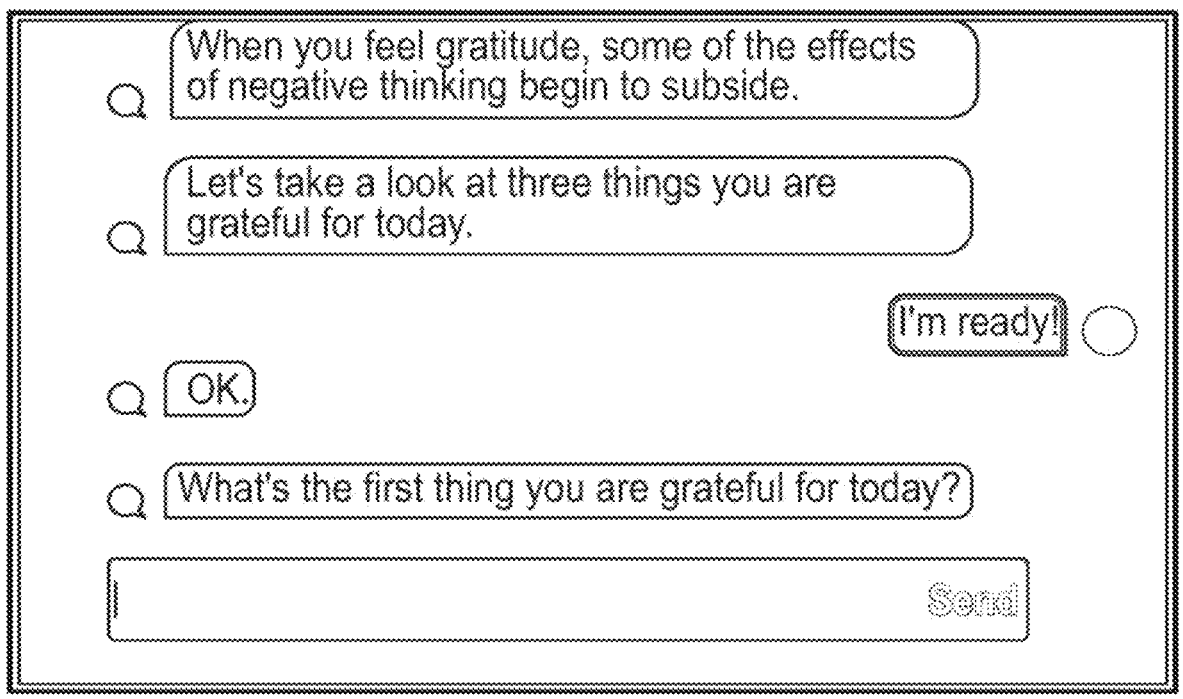
Figure 4C:
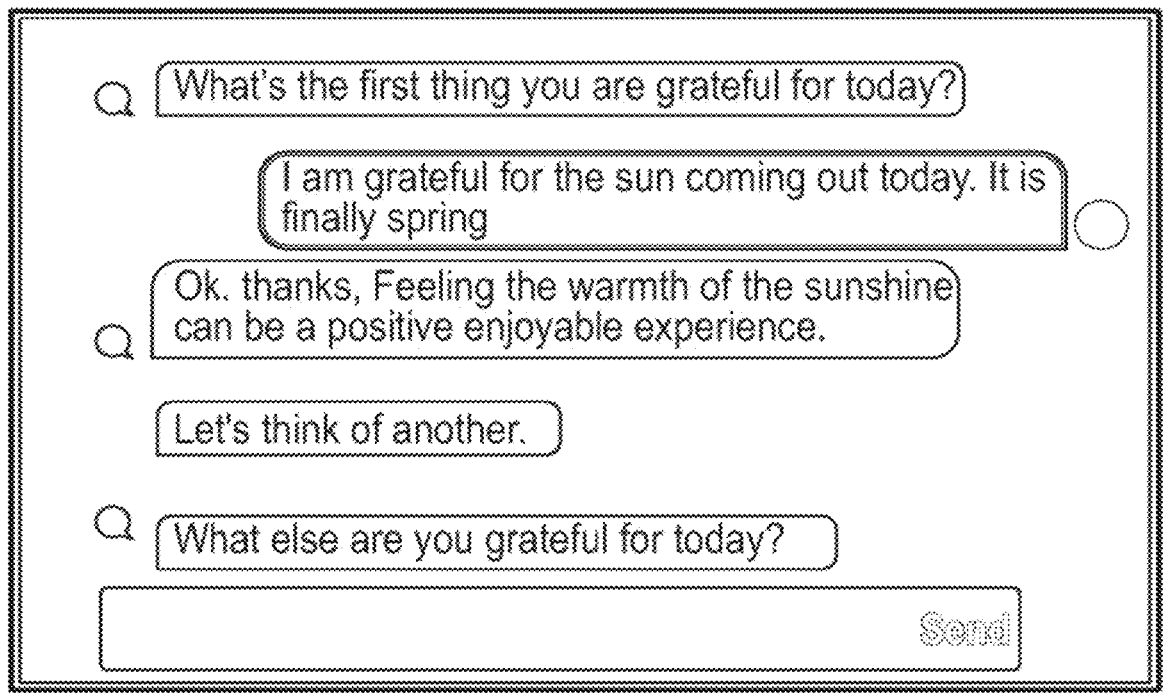
Figure 4D:
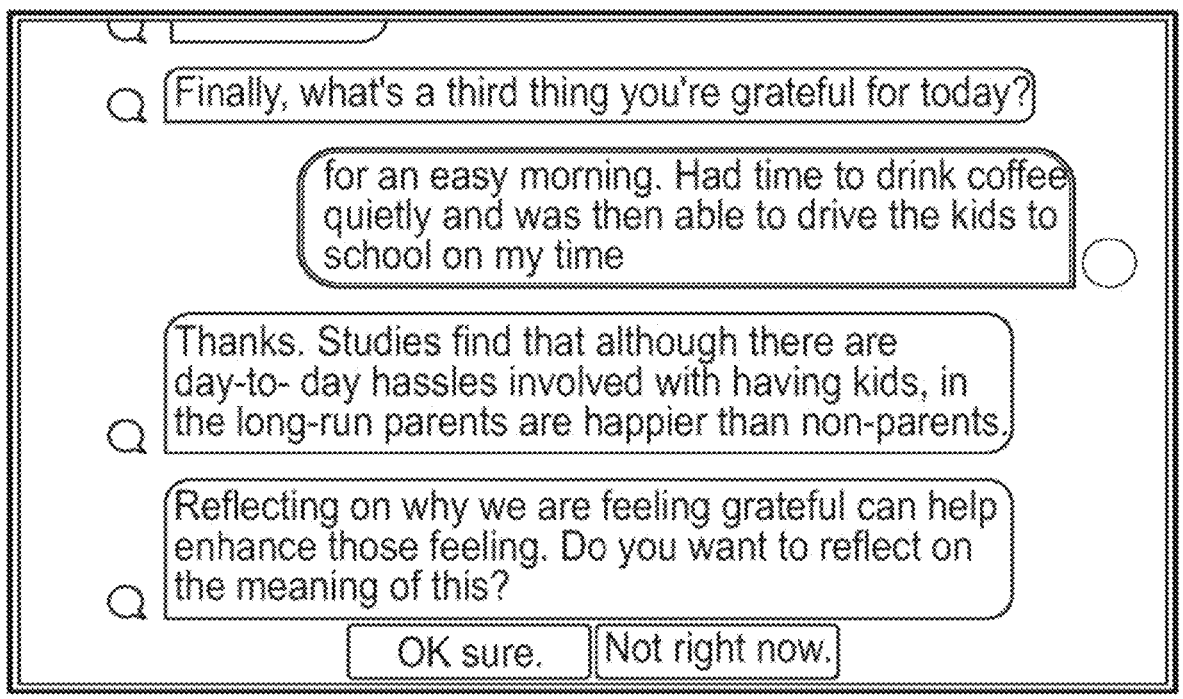

FIGS. 4A-4D show a series of screenshots of a device embodying the Happify system through which a user is engaged in an interactive session with the computing system. First, FIG. 4A shows a screenshot in which the computing system is inviting the user to an activity. The computing system explains that the activity is about looking at three things that the user is grateful for today and also explains the scientifically proven benefits behind this activity. Second, as shown in FIG. 4B, the user is asked for a first thing that he or she is grateful for today. It is noted that this conversation may not only be visual but also auditory and the user may not only type his or her response via a keyboard but also spoken speech may be captured via speech recognition techniques. In this example, as shown in the screenshot shown in FIG. 4C, the user responds: "I am grateful for the sun coming out today. It is finally spring!" and a mirroring prompt appears before the next turn in the dialogue takes place, saying "OK, thanks. Feeling the warmth of the sunshine can be a positive enjoyable experience." In accordance with the processes as disclosed above, this mirroring prompt is generated (or chosen from a list of available prompts) based on the topic "weather" and the subtopic "sunshine" detected from the user's response. The user is then asked for a second thing that he or she is grateful for today, and the user responds by typing: "I am grateful for my wife and my kids. They are the light of my life". Similarly, from this second response, the topic of "meaningful people" is detected and an appropriate mirroring prompt is provided. As described above, the computing system may, rather than choosing a mirroring prompt from the reference table, consult the Internet for a quote that mirrors the user's statement. For example, the following prompt may be shown to the user: "Got it. Randy Pausch, author of The Last Lecture, wrote that when we're connected to others, we become better people." Finally, the conversation moves to the next turn and the computing system asks the user for a third thing that he or she is grateful for today. As shown in the screenshot of FIG. 4D, this time, the user responds with: "for an easy morning. Had time to drink coffee quietly and was then able to drive the kids to school on my time." From this third response, the computing system detects a topic of "parenting" and delivers another mirroring prompt such as "Thanks. Studies find that although there are day-to-day hassles involved with having kids, in the long-run parents are happier than non-parents."

In the examples shown in FIGS. 4A-4D, it is noted that each of the mirroring prompt not only mirrors the content of the respective user response but also mimics the tone in which the user provided the response.

In accordance with the present invention, if and when the mirroring prompt feature is activated, a sub component such as a dialogue manager or an interaction manager within the computing system may perform one or more of the analyses discussed above. Various components may work concurrently to train and/or retrain the classifier in real time, run real time analysis on the dialogue or the conversation, and retrieve or generate a mirroring prompt that serves multiple purposes (e.g., show empathy, increase adherence, etc.).

In certain embodiments, an interactive session as discussed above is defined by the user freely speaking in the presence of the computing system. During the interactive session, the computing system may similarly speak back to the user and engage in an auditory conversation with the user. The computing system may intelligently adjust volume, pitch, gender, etc. of the spoken voice to as part of simulating empathy. For example, the computing system may distinguish a loud voice response from a quiet voice response. The computing system may also distinguish a rapidly spoken response from a calmly spoken response. The computing system may further distinguish an immediate response from a contemplated response. As such, the mirroring prompt may be more verbose or succinct or more high-key or low-key. When it is detected that the user is taking his or her time to answer a question, even prior to receiving a response, the computing system may ask what the user is thinking about. Accordingly, the mirroring prompt is not only relevant and indicative of identified topics and/or reflective of the ascertained tone from the user's response, but also contemplative of the user's mood, the user's habit, the user's manner, the user's style, etc.

Types of Interactive Sessions

In accordance with the present invention, an interactive session is triggered when the user is presented with an activity to be performed. As described above, some exemplary activities require the user to answer a series of questions. When these types of activities are presented, the session may become "interactive" when the user provides a response. As discussed above, the inventive computing system analyzes the text of the received response and simulates conveyance of empathy to increase the user's level of engagement to a particular activity or a happiness track.

In certain other embodiments, the user communicates with the computing system via a screen and a keyboard by ways of typing and reading words on the screen. The computing system may intelligently adjust the manner in which words are displayed, such as color, font or size or incorporate pictures or short video clips as part of simulating empathy.

In certain further embodiments, when a more physical activity is presented, such as requiring the user to perform a certain action (e.g., perform an exercise, go interact with other people, etc.), the performance of the activity by the user is monitored via various modules and sensors in connection with the computing system. When these types of activities are presented, the session may become "interactive" upon the computing system detecting a certain facial expression or a certain bio-physical change. For example, when the user is instructed to perform a particular exercise to help clear the user's mind, the computing system may monitor the user's heart rate and interrupt to provide an alternate activity when the user's heart rate has reached a certain threshold. Or, the computing system may monitor the user's posture and provide a guiding prompt. In these embodiments, the computing system can also simulate empathy, just as it does in an auditory or a visual conversation, by expressing a mirroring prompt that shows an understanding of the user's current feelings and/or by providing words of encouragement to show that the computing system is watching the user's performance in the shoes of the user.

As another example, when the user is performing a physical action as part of performing the presented activity, the computing system may analyze the facial expression, the voice, the gestures, etc. of the user to determine the user's mood or attitude toward the particular activity. Based on detecting certain facial expressions or hand gestures, the computing system may output a mirroring prompt. In accordance with the present invention, based on detected facial expression, the mirroring prompt may be commiserative, encouraging, sympathetic or mirroring. In other words, these additional input data from the sensors impact how the computing system determines the tone of the outputted mirroring prompt.

Accordingly, the feature of providing a mirroring prompt during an interactive session can be achieved through numerous ways. In the end, the computing system displays emotional intelligence by mirroring the user in the most appropriate way possible and such effect leads to a higher level of engagement and an increased commitment to remain engaged with the activity or track.

Proactive Triaging

In certain other embodiments, the inventive system includes artificial intelligence sufficient to provide a "proactive triaging" ability. One of the biggest causes for a drop in the level of engagement with sustained usage of program or application such as Happify is that the user is not finding a particular activity exciting or relevant. There may be additional different reasons why a user may not find wish to further engage with an activity. In some cases, the user is partaking in an activity while internally desiring something else. Most of the time, the user would not even bother requesting for a change and simply lose interest in continuing with the program. In one or more of these cases, it may be that the user is simply preoccupied with a certain different issue without fully realizing it.

Figure 5:
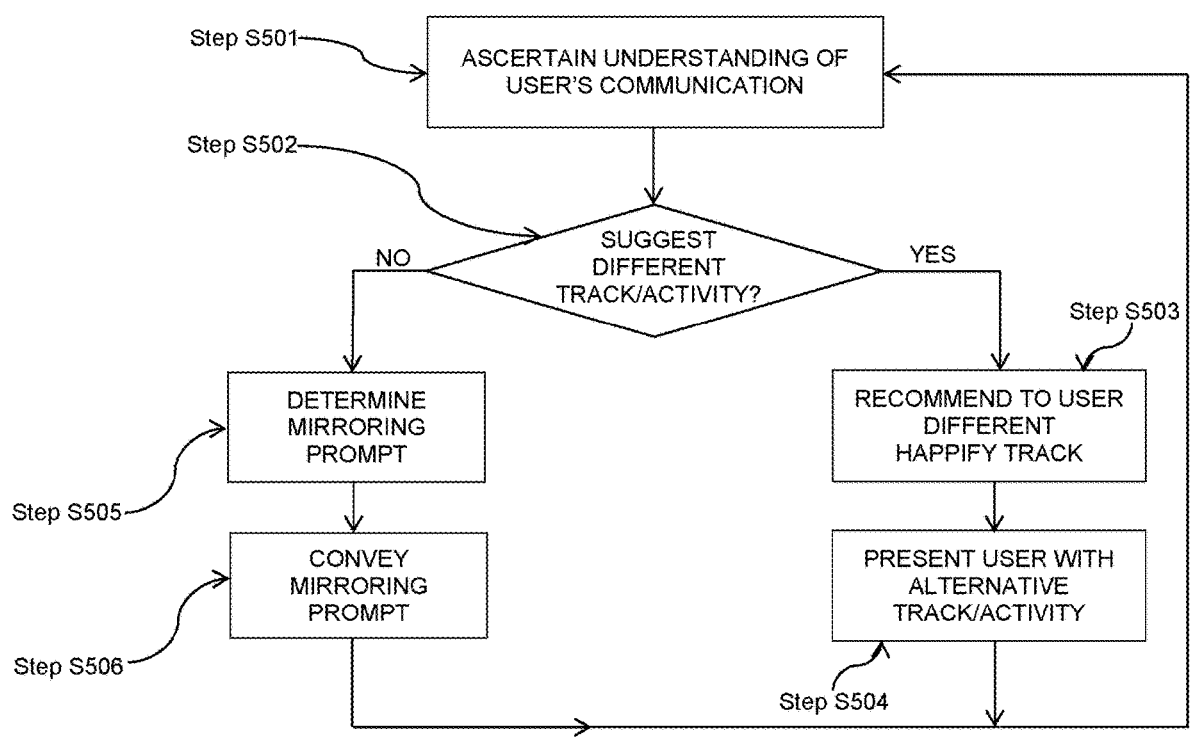
FIG. 5 is an exemplary flowchart explaining proactive triaging feature of the present invention.

As described in greater detail herein, with such proactive triaging ability, the computing system is capable of detecting, during an activity in progress and/or during an interaction with a user, that the user is currently focusing on a topic other than the one intended by the system, or focusing on a topic that is more relevant to a different Happify track or activity, and in such case, the system "proactively" suggests a suitable change to the user. Discovering the fact that the user is preoccupied with a different issue is in fact a new insight and a realization shared with the user. For instance, during execution of a particular activity within a selected Happify track, the computing system detects particular user behavior, characteristics and/or user feedback indicating a necessity for proceeding with a different activity within the selected track or proceeding to a different Happify track entirely and recommends a change to the user when appropriate. FIG. 5 shows an exemplary flowchart outlining the basic steps of the proactive triaging feature.

In accordance with an exemplary embodiment of the present invention, the user is engaged in an interactive session with the computing system. As shown in FIG. 5, the process for proactive triaging begins with ascertaining an understanding of the user's communication (Step S501). This step, similar to the mirroring feature described herein, entails multiple sub-steps. For example, the computing system employs techniques such as natural language classification, topic modeling, sentiment analysis, named entity extraction, emotion detection, etc. to identify and understand the contents of the user's communication. As previously described herein, the computing system may, for example, employ a trained classifier and identify one or more topics from the user's communication.

Once the computing system identifies topics from the content of the user's response, it determines whether a branching suggestion should be made (Step S502). This step also entails multiple sub-steps. For example, the computing system may employ a threshold system in which a determination as to suggesting a different track/activity is made when words suggestive of a different topic appear a certain number of times. As another example, the determination is made when none of the topics identified relates to the current activity/track. As yet another example, relevance of identified topics to the current activity/or track may be measured in a range of scale, and the branching determination is made when the relevance of the identified topics to the current activity/track is below a threshold level. As a further example, the computing system detects certain keywords that necessitate a branching suggestion. In some embodiments, the exact same set of AI engines as described above (e.g., emotion detection, topic modeling, natural language classification, etc.) are used to determine whether or not the branching suggestion should be presented to the user. For example, sensors may detect certain facial expressions or gestures indicating lack or loss of interest and the computing system determines that the branching suggestion should be made. As another example, the computing system may keep a track of the progress of the user in regards to the provided activity and/or the selected Happiness track, and a branching determination is made based on the level of progress of the user. The goal of proactive triaging is that at each and every turn in the dialogue/conversation, the computing system conducts proactive triaging to re-evaluate what is the best course of interaction/treatment for the user.

When it is determined that the branching suggestion should be made, the process proceeds to step S503. In step S503, the computing system notifies the user that the user is seemed to be focusing on a topic that is different from the current activity and presents a recommendation. When the user accepts the suggestion, the computing system presents the user with alternative track/activity that has been determined as the better course of action for the user (Step S504). Thereafter, the process can be repeated to determine how well the user is interacting with the new activity/track.

If it is determined that the branching suggestion is not needed, the process proceeds to step S505. In Step S505, the computing system determines a mirroring prompt and in Step S506, the computing system conveys the mirroring prompt to the user. These steps have already been described herein with reference to FIGS. 2-4.

In some embodiments, the proactive triaging feature is employed without the mirroring prompt feature. In certain other embodiments, the proactive triaging feature is employed concurrently with the mirroring prompt feature. In yet certain other embodiments, the mirroring prompt feature is carried out prior to the proactive triaging feature. Therefore, in some embodiments, the proactive triaging feature is the "next step" to the process of mirroring as disclosed herein. In accordance with the present invention, proactive triaging, thus, can be referred to as first, empathizing with the user and second, providing an advice or making a suggestion for a course of action to the user based on understanding of the user's emotion. More particularly, with proactive triaging, the computing system analyzes, for example, what the user has said and the manner in which it is said and provides an appropriate suggestion. In some embodiments, the computing system will not only provide a suggestion, but also explain the reasoning behind it.

An example of the proactive triaging in a conversation employed by the present invention is shown in Tables 5 and 6.

TABLE 5

Steps Leading to Proactive Triaging

| Computer | > What are things you can do to improve the quality of the time you spend with your children? |
| User | >> Perhaps if I stopped thinking about my debt and the possibility of filing for bankruptcy when I am with them, perhaps then I could be more present. |
| Computer | > Yes, it's normal to worry about things, but too much worry can rob us of good life experiences. |
| Computer | > Is there something else you can do to improve the quality of the time you spend together? |
| User | >> Well, I was thinking of taking them to the movies or even on a day trip up to the mountains, but every time I think of something likethat I get scared about expenses and not being able to pay for it. |

Initially, it should be noted from the above conversation that the computing system has employed the mirroring prompt and demonstrated human-like empathy by demonstrating an understanding tone and reflecting on the content of what the user just said (e.g., "it's normal to worry about things"). Moreover, the computing system continues the interaction and receives the user's further responses. During the course of the interaction, the computing system performs aforementioned analyses on the input data and identifies one or more words that are indicative of a different topic being mentioned repeatedly. For instance, in the above example, the computing system identifies the terms "debt," "bankruptcy" and "expenses" that all belong to another group (e.g., "financial management"). The computing system also recognizes a negative tone in relation to the usage of these terms in the conversation. The computing system also recognizes a repetition of these terms in the conversation. At this point, as shown in TABLE 6 below, in addition to simply empathizing or showing support, the computing system proactively suggests that the user switch to a different track that is focused on financial worry:

TABLE 6

Proactive Triaging

| Computer | > What are things you can do to improve the quality of the time you spend with your children? |
| User | >> Perhaps if I stopped thinking about my debt and the possibility of filing for bankruptcy when I am with them, perhaps then I could be more present. |
| Computer | > Yes, it's normal to worry about things, but too much worry can rob us of good life experiences. |
| Computer | > Is there something else you can do to improve the quality of the time you spend together? |
| User | >> Well, I was thinking of taking them to the movies or even on a day trip up to the mountains, but every time I think of something like that I get scared about expenses and not being able to pay for it. |
| Computer | > I noticed that you mention worrying or perhaps being stressed about finances. Happify has a track called: "Dealing with Financial Stress." Would it be useful for you to check it out? |

Additional Embodiments

The foregoing disclosure on how an artificially intelligent computing system can convey empathy to the user during a conversation is not intended to be limiting. A crucial component of the invention lies in acquiring ongoing and real time input data from the user and performing analysis to respond more empathetically and more emotionally and more in context. However, the extent of the analytic capability by the AI is not limited to simply detecting the "tone" or identifying certain "topics." For example, the artificially intelligent computing system can analyze input data to ascertain whether the user is answering the question truthfully, whether the user is only providing a partial answer to an inquiry, whether the user is engaged with enthusiasm or lack of enthusiasm, the extent to which the user is interested in the activity being performed, and whether the user prefers certain types of activities over other types of activities. In addition, when the user's response is analyzed, the computing system may detect not only topics, but also entities, and what the user's sentiment is toward these entities. Any of these analyses may be performed in addition to, or in conjunction with, the above described analyses to develop a conversation that is emotionally specific.

In accordance with the present invention, the techniques as disclosed herein for the computing system to utilize AI in demonstrating empathy and providing more in context response goes far beyond merely automating what may occur in a typical current-day therapy session. One most notable advantage of the present computing system is its capability of providing a "super human" therapy or coaching session. A human therapist/coach bases his or her treatment based on familiarity with X number of patients. In contrast, the computing system of the present invention implements mirroring and other data-driven methods based on data collected from millions of users. For example, the computing system of the present invention knows how people tend to respond to a certain question much better than any single human therapist. Moreover, the computing system in accordance with the present invention can choose from a very large number of prompts, or generate new prompts from using natural language generation tools, some of which may include scientific facts, quotes, etc. in a way that significantly exceeds the capacity of a single human therapist. For example, if a user is into Danish movies from the 1950s, the computing system can find and/or generate a prompt weaving that into the conversation. No human therapist can personally relate to all topics that interest millions of people.

In accordance with the present invention, the English language is not intended to limit application or scope of any of the foregoing aspects of the present invention. For example, the classifier may be trained in multiple languages and one or more of the known techniques employed may work equally in different languages. In some embodiments, the artificial intelligence of the computing system may also learn cultural uniqueness in regards to tone, or in regards to conveyance of empathy in general, and adapt accordingly.

In the foregoing disclosure of the various embodiments of the present invention and variants thereof, it is noted that use of any of the following: "at least one of," "/," and "and/or," for example, in the cases of "at least one of X and Y," "X/Y," and "X and/or Y" is intended to encompass the selection of the first listed option (X) only, or the selection of the second listed option (Y) only, or the selection of both options (X and Y). As a further example, in the cases of "X, Y, and/or Z" and "at least one of X, Y, and Z", such phrasing is intended to encompass the selection of the first listed option (X) only, or the selection of the second listed option (Y) only, or the selection of the third listed option (Z) only, or the selection of the first and the second listed options (X and Y) only, or the selection of the first and third listed options (X and Z) only, or the selection of the second and third listed options (Y and Z) only, or the selection of all three options (X and Y and Z). This may be extended, as readily apparent by one of ordinary skill in this and related arts, for as many items listed.

Appearances of the phrase "in one embodiment" or "in an embodiment," or any other variations of this phrase, appearing in various places throughout the specification are not necessarily all referring to the same embodiment. In the specification, references to "an embodiment" or "one embodiment" of the present principles, as well as variations other than these, mean that a particular characteristic, feature, structure, and so forth described in connection with the embodiment described is included in at least one embodiment of the present principles.

The present principles may be incorporated in a system, a method, and/or the product of a computer program, the product including a computer readable storage medium having program instructions that are readable by a computer, causing aspects of the present invention to be carried out by a processor.

The program instructions are readable by a computer and can be downloaded to a computing/processing device or devices from a computer readable storage medium or to an external computer or external storage device via a network, which can comprise a local or wide area network, a wireless network, or the Internet. Additionally, the network may comprise wireless transmission, routers, firewalls, switches, copper transmission cables, optical transmission fibers, edge servers, and/or gateway computers. Within the respective computing/processing device, a network adapter card or network interface in each computing/processing device receives computer readable program instructions from the network and forwards the computer readable program instructions for storage in a computer readable storage medium.

As herein used, a computer readable storage medium is not to be construed as being transitory signals per se, such as radio waves or other freely propagating electromagnetic waves, electromagnetic waves propagating through a waveguide or other transmission media, or electrical signals transmitted through a wire. The computer readable storage medium may be, but is not limited to, e.g., a magnetic storage device, an electronic storage device, an optical storage device, a semiconductor storage device, an electromagnetic storage device, or any suitable combination of the foregoing, and can be a tangible device that can retain and store instructions for use by an instruction execution device. The following is a list of more specific examples of the computer readable storage medium, but is not exhaustive: punch-cards, raised structures in a groove, or other mechanically encoded device having instructions recorded thereon, an erasable programmable read-only memory, a static random access memory, a portable compact disc read-only memory, a digital versatile disk, a portable computer diskette, a hard disk, a random access memory, a read-only memory, a memory stick, a floppy disk, and any suitable combination of the foregoing.

The operations of the present invention may be carried out by program instructions which may be machine instructions, machine dependent instructions, microcode, assembler instructions, instruction-set-architecture instructions, firmware instructions, state-setting data, or either source code or object code written in any combination of one or more programming languages, including an object oriented programming language such as, but not limited to, C++, Python, Java, and other conventional procedural programming languages. The program instructions, while having the capability of being executed entirely on the computer of the user, may also be executed partly on the computer of the user, partly on a remote computer and partly on the computer of the user, entirely on the remote computer or server, or as a stand-alone software package. In the "entirely on the remote computer or server" scenario, the remote computer may be connected to the user's computer through any type of network, including a wide area network or a local area network, or the connection may be made to an external computer. In some embodiments, electronic circuitry including, e.g., field-programmable gate arrays, programmable logic circuitry, or programmable logic arrays may execute the program instructions by utilizing state information of the program instructions to personalize the electronic circuitry, in order to perform aspects of the present invention.

These program instructions may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. These program instructions may also be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer readable program instructions may also be loaded onto a computer, other programming apparatus, or other device to produce a computer implemented process, such that the instructions which execute on the computer, other programmable apparatus, or other device implement the functions/acts specified in the flowchart and/or block diagram block or blocks.

Aspects of the present invention are described herein with reference to block and/or other diagrams and/or flowchart illustrations of methods, apparatus, and computer program products according to the present invention's embodiments. It will be understood that each block of the block and/or other diagrams and/or flowchart illustrations, and combinations of blocks in the block and/or other diagrams and/or flowchart illustrations, can be implemented by program instructions that are readable by a computer.

The block and/or other diagrams and/or flowchart illustrations in the Figures are illustrative of the functionality, architecture, and operation of possible implementations of systems, methods, and computer program products according to the present invention's various embodiments. In this regard, each block in the block and/or other diagrams and/or flowchart illustrations may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently or sometimes in reverse order, depending upon the functionality involved. It will also be noted that each block of the block and/or other diagram and/or flowchart illustration, and combinations of blocks in the block and/or other diagram and/or flowchart illustration, can be implemented by special purpose hardware-based systems that perform the specified functions or acts or carry out combinations of special purpose hardware and computer instructions.

In view of the foregoing disclosure, an inventive computing system and technique for interacting with users have been described. In accordance with the disclosure provided herein, a computing system engages with users in a novel manner, for the purpose of improving levels of happiness, or more broadly, to alleviate or reduce symptoms of mental health conditions such as depression and anxiety, such interaction entailing simulation of human emotion and/or human cognitive skills by the computing system, to beneficially result in a high level of engagement by the users and better efficacy of the overall interaction, leading to higher increases in the behavior and/or the psychological well-being of the users. In further accordance with the disclosure provided herein, the computing system receives and analyzes on-going supply of user data for the purposes of identifying topics and tone of the user's communication and responding with a mirroring or an appropriate tone that most empathetically advances an interactive session with the user. Finally, in accordance with the disclosures provided herein, the computing system proactively recognizes the user's adherence or enthusiasm toward a given program and recommends alternative options that have been determined to better suit the user's current physical and/or psychological states.

What is claimed is:

1. A computing system for interacting with a user, the computing system comprising:
   at least one processor;
      at least one memory storing executable software which, when executed by the at least one processor, causes the at least one processor to:
      commence an interactive session with a user,
         wherein the interactive session is part of a happiness track selected by the user;
      receive input data from the user during the interactive session;
      analyze the received input data; and
      output a response to the user to continue the interactive session with the user,
   wherein the executable software stored in the at least one memory is adapted to cause the at least one processor, prior to outputting the response, to carry out the following steps:
      identify one or more topics from the received input data;
      ascertain a tone of the received input data;
      generate a mirroring prompt based on the ascertained tone of the received input data; and
      output to the user the generated mirroring prompt, and
   wherein the executable software stored in the at least one memory is adapted to cause the at least one processor to output the mirroring prompt to the user during the interactive session to cause an increase in a level of engagement of the user with the interactive session,
   wherein the interactive session further includes a proactive triaging ability for responding to the received input data, and wherein the executable software stored in the at least one memory is adapted to cause the at least one processor to:
      detect one or more non-correlative keywords from the received input,
         wherein the one or more non-correlative keywords do not correlate to the happiness track;
      determine a frequency of the one or more non-correlative keywords;
      determine whether to generate a branching suggestion via a threshold determination system, wherein the threshold determination system is configured to evaluate whether the frequency of the one or more non-correlative keywords surpasses a branching threshold;
generate and output a branching suggestion upon meeting the branching threshold,
wherein the branching suggestion comprises a recommendation for an alternative happiness track.

2. The computing system of claim 1, wherein the executable software stored in the at least one memory is adapted to cause the at least one processor to generate the mirroring prompt having one or more phrases indicative of the identified one or more topics, and
wherein the generated mirroring prompt is reflective of the ascertained tone.

3. The computing system of claim 1, wherein the executable software stored in the at least one memory is adapted to cause the at least one processor to generate the mirroring prompt having one or more phrases indicative of the identified one or more topics, and
wherein the generated mirroring prompt is of a tone that has been previously determined as an appropriate tone for responding to the ascertained tone.

4. The computing system of claim 1, further comprising:
a database storing a plurality of selectable mirroring prompts,
wherein the executable software stored in the at least one memory is adapted to cause the at least one processor to generate the mirroring prompt by selecting at least one of the stored selectable mirroring prompts.

5. The computing system of claim 1, wherein the executable software stored in the at least one memory is adapted to cause the at least one processor to generate the mirroring prompt by using natural language generation techniques.

6. The computing system of claim 1, further comprising:
a communication device capable of communicating with an external computer,
wherein the executable software stored in the at least one memory is adapted to cause the at least one processor to, via the communication device, obtain from the external computer information about the identified one or more topics, and
wherein the executable software stored in the at least one memory is adapted to cause the at least one processor to generate the mirroring prompt using the obtained information.

7. The computing system of claim 6, wherein the information obtained from the external computer includes current information pertaining to the identified one or more topics accessible via the Internet.

8. The computing system of claim 1, further comprising:
at least one sensor in communication with the at least one processor, the at least one sensor being adapted to obtain supplemental user data,
wherein the executable software stored in the at least one memory is adapted to cause the at least one processor to generate the mirroring prompt at least in part on the obtained supplemental user data.

9. The computing system of claim 1, wherein the interactive session is part of a happiness track selected by the user, and
wherein the executable software stored in the at least one memory is adapted to cause the at least one processor to output the mirroring prompt to the user during the interactive session to further cause an increase in a level of happiness of the user in accordance with the selected happiness track.

10. A method for a computing system to interact with a user, the computing system comprising at least one processor, the method comprising:
commencing, by the at least one processor, an interactive session with a user, wherein the interactive session is part of a happiness track selected by the user;
receiving, by the at least one processor, input data from the user during the interactive session;
analyzing, by the at least one processor, the received input data; and
outputting, by the at least one processor, a response to the user to continue the interactive session with the user, wherein prior to outputting the response, the at least one processor:
identifies one or more topics from the received input data;
ascertains a tone of the received input data;
generates a mirroring prompt based on the ascertained tone of the received input data; and
output to the user the generated minoring prompt, and
wherein the outputting of the minoring prompt to the user during the interactive session causes an increase in a level of engagement of the user with the interactive session,
wherein the interactive session further includes a proactive triaging ability for responding to the received input data, the proactive triaging ability comprising:
determining a level of progress of the happiness track;
determining whether to generate a branching suggestion via a threshold determination system,
wherein the threshold determination system is configured to evaluate whether the level of progress of the happiness track surpasses a branching threshold;
generating and outputting a branching suggestion upon meeting the branching threshold,
wherein the branching suggestion comprises a recommendation for an alternative happiness track.

11. The method of claim 10, wherein the at least one processor generates the minoring prompt having one or more phrases indicative of the identified one or more topics, and
wherein the generated minoring prompt is reflective of the ascertained tone.

12. The method of claim 10, wherein the at least one processor generates the mirroring prompt having one or more phrases indicative of the identified one or more topics, and
wherein the generated mirroring prompt is of a tone that has been previously determined as an appropriate tone for responding to the ascertained tone.

13. The method of claim 10, wherein the computing system further comprises a database storing a plurality of selectable mirroring prompts, and
wherein the at least one processor generates the mirroring prompt by selecting at least one of the stored selectable mirroring prompts.

14. The method of claim 10, wherein the at least one processor generates the mirroring prompt by using natural language generation techniques.

15. The method of claim 10, wherein the computing system further comprises a communication device capable of communicating with an external computer,
wherein the at least one processor, via the communication device, obtains from the external computer information about the identified one or more topics, and
wherein the at least one processor generates the mirroring prompt using the obtained information.

16. The method of claim 15, wherein the information obtained from the external computer includes current information pertaining to the identified one or more topics accessible via the Internet.

17. The method system of claim 10, wherein the computing system further comprises at least one sensor in communication with the at least one processor, the at least one sensor being adapted to obtain supplemental user data,
wherein the at least one processor generates the mirroring prompt at least in part on the obtained supplemental user data.

18. The method system of claim 10, wherein the interactive session is part of a happiness track selected by the user, and
wherein the at least one processor outputs the minoring prompt to the user during the interactive session to further cause an increase in a level of happiness of the user in accordance with the selected happiness track.

19. A computing system for interacting with a user, the computing system comprising:
at least one processor;
at least one memory storing executable software which, when executed by the at least one processor, causes the at least one processor to:
commence an interactive session with a user, the interactive session being part of a happiness track selected by the user;
receive input data from the user during the interactive session;
analyze the received input data; and
output a response, to the user, to continue the interactive session with the user, wherein the executable software stored in the at least one memory is adapted to cause the at least one processor, during the interactive session, to carry out the following steps:
identify one or more topics from the received input data;
determine a relevance of the identified one or more topics to the selected happiness track via an artificial intelligence engine;
determine, via the artificial intelligence engine, whether the received input data comprises a partial answer;
determine whether to output an option to the user for switching to a different happiness track when the relevance of the identified one or more topics to the selected happiness track is not greater than a threshold; and
generate and display an explanation based on the switching to the different happiness track.

20. The computing system of claim 19, wherein the artificial intelligence engine is a topic modeling engine.

21. The computing system of claim 19, wherein the executable software stored in the at least one memory is further adapted to cause the at least one processor to determine to output the option to the user for switching to a different happiness track based on tone of the received input data.

22. A method for a computing system to interact with a user, the computing system comprising at least one processor, the method comprising:
commencing, by the at least one processor, an interactive session with a user, the interactive session being part of a happiness track selected by the user;
receiving, by the at least one processor, input data from the user during the interactive session;
analyzing, by the at least one processor, the received input data; and outputting, by the at least one processor, a response to the user to continue the interactive session with the user,
wherein during the interactive session, the at least one processor:
identifies one or more topics from the received input data;
detects, via one or more sensors, one or more facial expressions and one or more gestures of the user;
determines whether the one or more facial expressions and one or more gestures exhibit a lack of interest in the happiness track; and
determines whether to output an option to the user for switching to a different happiness track as a function of the lack of interest in the happiness track.

23. The method of claim 22, wherein the at least one processor further determines to output the option to the user for switching to a different happiness track when relevance of the identified one or more topics to the selected happiness track is not greater than a threshold.

24. The method of claim 23, wherein the at least one processor further determines to output the option to the user for switching to a different happiness track when the identified one or more topics having relevance not greater than the threshold is detected a plurality of times.

25. The method of claim 22, wherein the at least one processor further determines whether the one or more facial expressions and one or more gestures exhibit a lack of interest in the happiness track via an emotion detection AI engine.

* * * * *